United States Patent [19]
Cok et al.

[11] Patent Number: 5,276,510
[45] Date of Patent: Jan. 4, 1994

[54] AIRBRUSH MODELING ROUTINE FOR AN ELECTRIC IMAGE REPRODUCTION SYSTEM

[75] Inventors: David R. Cok, Rochester; Henry Nicponski, Albion, both of N.Y.

[73] Assignee: Eastman Kodak Company, Rochester, N.Y.

[21] Appl. No.: 746,664

[22] Filed: Aug. 19, 1991

[51] Int. Cl.⁵ .............................................. H04N 1/46
[52] U.S. Cl. .................................. 358/500; 358/527; 345/179; 345/180; 345/168
[58] Field of Search .................... 358/75, 76, 80, 78; 340/703, 701, 707, 708, 709

[56] References Cited

U.S. PATENT DOCUMENTS

| | | | |
|---|---|---|---|
| 4,500,919 | 2/1985 | Schreiber | 358/78 |
| 4,514,818 | 4/1985 | Walker | 358/160 |
| 4,878,178 | 10/1989 | Takakura et al. | 340/703 |
| 4,958,220 | 9/1990 | Alessi et al. | |
| 4,979,032 | 12/1990 | Alessi et al. | 358/76 |
| 5,131,056 | 7/1992 | Willcocks | 358/80 |

FOREIGN PATENT DOCUMENTS 0367405  5/1990  European Pat. Off.
0403054  12/1990 European Pat. Off.
2207587  2/1989  United Kingdom.

Primary Examiner—Edward L. Coles, Sr.
Assistant Examiner—C. Lam
Attorney, Agent, or Firm—Parkhurst, Wendel & Rossi

[57] ABSTRACT

An improved airbrush modeling routine is disclosed that can be implemented in a conventional electronic image reproduction system. The improved airbrush modeling routine incorporates an interpolation function with velocity smoothing to provide improved sampling of brush location during airbrushing operations by calculating the average velocity between sample intervals and determining average acceleration. In addition, randomness is introduced in the improved airbrush modeling routine to provide for a "textured" appearance in a retouched area of an original image.

8 Claims, 3 Drawing Sheets

AIRBRUSH MODELING ROUTINE FOR AN ELECTRIC IMAGE REPRODUCTION SYSTEM

FIELD OF THE INVENTION

The present invention relates generally to color image reproduction apparatus. More specifically, the invention relates to an apparatus that produces a hard copy reproduction of a displayed video image wherein the apparatus includes a mechanism for modifying the displayed image to produce a more aesthetically pleasing reproduction.

BACKGROUND OF THE INVENTION

Systems are commercially available that permit an operator to edit or modify the color and composition of an original image to form a more aesthetically pleasing reproduction of the image in hard copy form. One example of such a system is the KODAK PREMIER Image Enhancement System manufactured by the Eastman Kodak Company of Rochester, N.Y. The KODAK PREMIER Image Enhancement System incorporates a film reader unit to digitally scan original images in the form of negatives, transparencies or lithographic film and display the scanned original images at an operator workstation which includes a monitor, keyboard, and digitizing tablet, with accompanying stylus, coupled to a processing unit. An operator can utilize the workstation to alter the original images by cropping, rotating, resizing, changing the color balance, or performing a multitude of other manipulation functions. The altered original images are then reproduced in hard copy form by a writing unit.

In such a system, it is particularly desirable to incorporate an interactive electronic "airbrush" manipulation function in the reproduction apparatus, i.e., a function that permits the operator to retouch the original image displayed in video form on the monitor of the workstation in a manner similar to conventional airbrushing of photographic negatives or prints. For example, the operator can use the airbrush function to lighten, darken, change the contrast, or add color to selected areas of the displayed image. The electronic airbrush function, however, must closely model the operation of a conventional airbrush in both function and result in order to gain the acceptance of operators accustomed to their use.

Attempts to create an electronic airbrush function within a color image reproduction apparatus have met with only limited success to date, as conventional methods of electronically modeling the functions of a conventional mechanical airbrush as described above have not produced an electronic airbrush function which, in the eyes of conventional airbrush operators, realistically duplicates the use of a conventional mechanical airbrush. Accordingly, it is an object of the present invention to provide an airbrush modeling function for an electronic image reproduction system that realistically models the operation of a conventional mechanical airbrush in both function and result.

SUMMARY OF THE INVENTION

The invention provides an improved airbrush modeling routine that can be implemented in a convention electronic image reproduction system. The improved airbrush modeling routine incorporates an interpolation function with velocity smoothing to provide improved sampling of brush location during airbrushing operations. In addition, randomness is introduced in the improved airbrush modeling routine to provide for a "textured" appearance in a retouched area of an original image.

DETAILED DESCRIPTION OF THE PREFERRED EMBODIMENTS

With the above as background, reference should now be made to the following detailed description of the preferred embodiments and the accompanying drawings, in which.

DETAILED DESCRIPTION OF THE PREFERRED EMBODIMENTS

The invention will be described with particular reference to the KODAK PREMIER Image Enhancement System manufactured by the Eastman Kodak Company of Rochester, N.Y. It will be understood, however, that the invention is applicable to other types of digital image enhancement systems and is not limited to the specific application and system described below.

Figure 1:
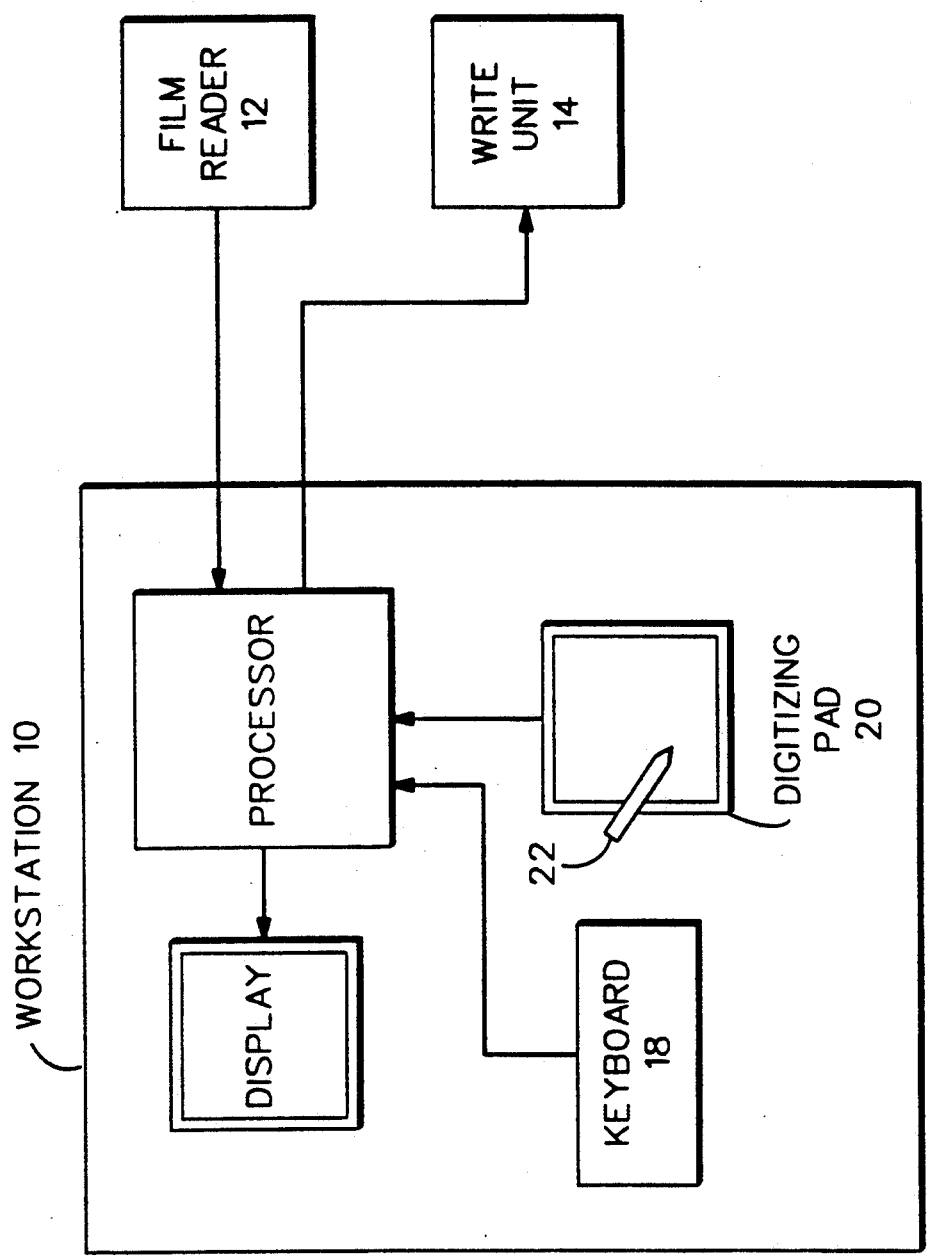
FIG. 1 is a diagram of a conventional electronic image reproduction system.

Referring now to FIG. 1, a diagram of an electronic image reproduction system, for example the above-described KODAK PREMIER Image Enhancement System, is shown including a workstation unit 10, coupled to a film reader unit 12, and a write unit 14. The workstation 10 (preferably a SUN MICROSYSTEMS SPARCstation II computer manufactured by Sun Microsystems Inc. of Mountain View, Calif.) includes a monitor 16, keyboard 18 and digitizing pad 20 (Wacomb Digitizer SD422-L), with accompanying stylus 22, coupled to a processing unit 16.

The film reader unit 12 digitizes images from a variety of media, including negative, reversal, and lithographic films, with a curved bed scanner unit (not shown) that simultaneously produces separate red, green and blue image signals. The scanner unit incorporates the use of a charge coupled device (CCD) having 8,000 pixel elements and integral color filters to perform the scanning operation in a conventional manner. The red, green and blue image signals generated by the film reader unit 12 are supplied to the processing unit 16 for image enhancement processing.

The write unit 14 includes a Xenon arc lamp to generate a white light which in turn is separated into red, green and blue spectral channels. The light from the spectral channels is focused into fiber-optic cables and conveyed to PLZT electro-optic modulators. The light passing through the electro-optic modulators are combined to produce a spot of light with the optical power required to write digital color images at 1000 pixels per inch. The electro-optic modulators contained within the write unit 14 are controlled by signals received from the processing unit 16.

In operation, the processing unit 16 generates and displays a video image representation of the original image on the monitor 18 based on the red, green and blue image signals supplied by the film reader unit 12. An operator utilizes the keyboard 18 and digitizing pad 20 to provide command signals to the processing unit 16 in order to perform a plurality of editing functions. The command signals may alternatively be entered by a "mouse" device (not shown) if desired. The editing functions include:

CROP—eliminates unwanted portions of image edges;
REPLICATE—permits the "stretching" of an image by repetition of selected portions;
SIZE CHANGE—magnifies image size by a specified factor;
MASK—defines "regions of interest" by boundary specifications;
CUT—extract a select image portion;
PASTE—combine one image with another;
COLOR BALANCE—change overall image color;
CONTRAST—manipulate contrast curves;
HUE/CHROMA/LIGHTNESS—independent control of color quantities; and
AIRBRUSH—permits selected portions of the image to be retouched.

The processing unit 16 modifies the image displayed on the monitor 18 based on the command signals entered by the operator and displays the modified or enhanced image on the monitor 18. The operator can make additional changes to the enhanced image until satisfied with the overall appearance of the image presented on the monitor 18. Once satisfied, the operator enters a write command signal to the processing unit 16 to print or write the displayed image in hard copy form. The processing unit 16 controls the operation of the write unit 14 in response to the write command signal to generate the hard copy reproduction of the image displayed on the monitor 18. A more detailed explanation of the operation of the electronic image reproduction system is provided in U.S. Pat. No. 4,979,032 issued to Alessi et al. on Dec. 18, 1990 and U.S. Pat. No. 4,958,220 issued to Alessi et al. on Sep. 18, 1990, the contents of which are hereby incorporated by reference.

In the conventional system outlined above, coordinate information is entered by the operator by pressing the stylus 22 against the working surface of the digitizing pad 20. The digitizing pad 20 generates digital signals representative of the coordinate location of the stylus 22 on the surface of the pad and provides the signals to the processing unit 16. It will be understood that other types of pointing devices, such as a mouse, touch sensitive screen, etc., can be used in place of the digitizing pad 20 and stylus 22 to define the coordinate information. The "paint flow", i.e., the magnitude of a selected image enhancement operation to be performed at the coordinate location, is regulated by the amount of pressure applied by the stylus 22 to the surface of the digitizing pad 20. The digitizing pad 20 generates a pressure signal that is indicative of the amount of pressure applied to the surface of the digitizing pad 20 by the stylus 22, and supplies the pressure signal to the processing unit 16.

The processing unit 16 includes windowing system software (SUNVIEW) that reads a sample of the stylus coordinates at fixed intervals of time. The samples are converted to objects called "events" by the windowing system software. An airbrush modeling routine designed to process the events and stored in memory available in the processing unit 16, is notified by the windowing system software each time an event becomes available. The airbrush modeling routine processes the events to alter the image displayed on the monitor in accordance with the stylus coordinate data entered by the operator. Specifically, the airbrush modeling routine responds to each event by applying a burst of a selected image enhancement operation to the displayed image based on the defined parameters of the operation, namely the paint flow rate defined by the pressure signal generated by the digitizer pad and the coordinate locations defined by the location of the stylus on the digitizer pad, and the specifics of the "brush" to be used, namely the size and shape of the area to be subjected to the image enhancement operation (defined as the brush mask).

The results of the above-described airbrush modeling routine, however, do not realistically mimic the results obtained by a conventional mechanical airbrush. One reason for this shortcoming is that a conventional mechanical airbrush comprises, for all intents and purposes, a continuous system when compared with the sampling rate of the windowing system software, which accumulates samples of the stylus coordinates at a maximum rate of about 40 samples/second. Modeling of an essentially continuous system with such a coarse sampling resolution introduces crude approximations which cause undesirable artifacts in the edited image.

Figure 2:
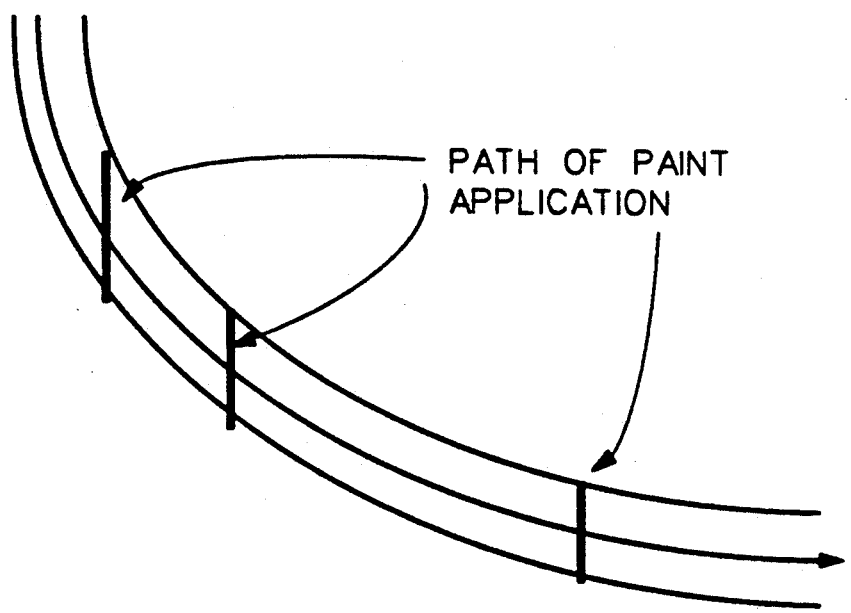
FIG. 2 is a diagram illustrating the continuous flow process of a conventional mechanical airbrush.
Figure 3:
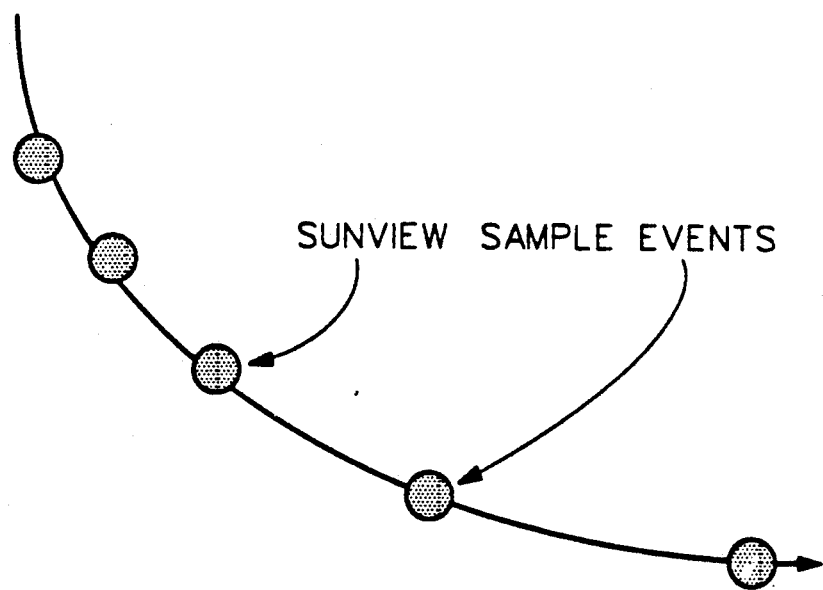
FIG. 3 is a diagram illustrating the discrete sampling of coordinates utilized in a conventional electronic image reproduction system of the type illustrated in FIG. 1.

FIGS. 2 and 3, for example, show the effect of the coarseness of the sampling of the stylus coordinates relative to the velocity and acceleration of the stylus 22 in the airbrush modeling system as compared with the operation of a conventional mechanical airbrush. As shown in FIG. 2, as the velocity and acceleration of an mechanical airbrush vary, the essentially continuous nature of the airbrush results in a variation of the apparent density of the application of paint; the change in the density of the application relates direction to the operator's handling of the brush. At no time, however, does the movement of the airbrush become sufficiently slow or fast to cause the continuous process to break down to a resulting non-continuous application of paint flow. Such is not the case for the airbrush modeling routine which breaks down badly as the speed of the "brush" (i.e., stylus) movement increases thereby resulting in a very discrete appearance as illustrated in FIG. 3.

A second reason for a lack of realism in the results obtained from the airbrush modeling routine is the fact that the conventional mechanical airbrush incorporates a significant degree of microscopic randomness due to the variability of the flow of air from the air supply, the flow of paint from the reservoir, the movement of air in the room, and the physical behavior of the paint when it strikes the work surface. The randomness is perceived by the operator of the airbrush as "texture" (or more analytically as "noise") in the paint applied to the work. The texturing is a very important because real image information contains "texture" and the presence of the texture permits the airbrushed portion of the work to fit in or blend with the real image information. The lack of the ability of the airbrush modeling routine to provide texture causes a viewer of the modified image to readily recognize the portion of the image that has been retouched, as the retouched portion does not include the same random noise contained in the rest of the original image.

The invention overcomes the disadvantages associated with the coarse sampling rate of the conventional airbrush modeling system described above by providing an improved airbrush modeling routine that utilizes a substantially smaller sample interval. It is possible, of course, to increase the effective sampling rate in the underlying windowing system software or to directly bypass the windowing system software so that the stylus coordinate information is directly supplied to the airbrush modeling program. These approaches, however, are not desirable because both are inherently less portable and the former strategy would increase the amount of fixed overhead lost to the windowing system software. Instead, the improved airbrush modeling routine employs a strategy of interpolating events of finer temporal resolution.

Figure 4:
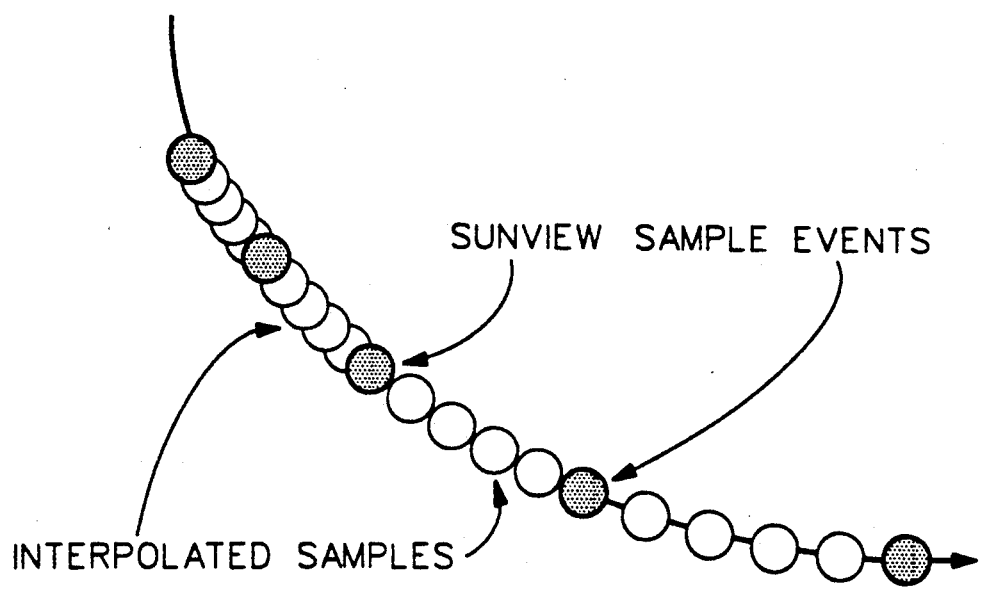
FIG. 4 illustrates the interpolation process employed in the improved airbrush modeling routine of the present invention to create sub-intervals.

FIG. 4 illustrates the interpolation process employed in accordance with the present invention wherein each window system interval is divided into four sub-intervals and the standard application of brush operation is applied at the terminal point of each sub-interval in an amount inversely proportional to the number of sub-intervals. Thus, the total "point sprayed", i.e. the magnitude of the image enhancement operation, during a brush operation during an interval is independent of the finess of its division into sub-intervals; however, the visual density of the application will be proportional to the speed of movement of the stylus.

Experimentation has shown that the quality of the visual approximation to the flow of an airbrush improves as the number of sub-intervals increase. For example, experimental prototype code implementing the improved airbrush modeling routine on a SUN-4/370 processor using eight sub-intervals produces a very good visual airbrush effect, while the use of four sub-intervals produces and effect that is still within acceptable levels. Increasing the number of sub-intervals, however, also increases the amount of computing power required to perform the airbrush modeling routine. Thus, the number of sub-intervals to be utilized is necessarily limited by the available computation power of the workstation 10.

The "size" of the brush also places a demand on available computation power. The operator can preferably set the brush size from between 1-128 pixels which in turn changes the total effective area of the brush mask, wherein the brush mask defines the area of the image to which the image enhancement operation is to be applied. For example, if the brush mask is defined as a square, the length of the sides of the square are defined by the brush size. Thus, a brush size of four pixels yields a 4×4 square pixel brush mask. The computational power required to perform the airbrush modeling routine increases as the brush size and the corresponding area of the brush mask increases. In order to provide the best trade-off between brush size, image quality and computational power, it is preferable to scale the number of sub-intervals to be utilized based on the brush size, i.e., the sub-intervals are reduced as the brush size increases to partially compensate for the higher computational requirements of the larger brush size.

Another factor that must be taken into account is the gross sampling of the velocity of the stylus. A velocity anomaly, which would induce a corresponding paint density anomaly in the image, would occur at the boundary between two sample intervals if the average velocity were used to lay out the sub-intervals in adjacent window sample intervals. The improved airbrush modeling routine incorporates velocity smoothing in to overcome this problem. If it is assumed that the velocity at the midpoint of each sample interval equals the average velocity of that interval, then a constant acceleration can be computed and applied across sub-intervals to smoothly vary the velocity between the midpoints. The equations set forth below are utilized to compute the coordinates of the sub-interval boundaries with velocity smoothing. For example, given three consecutive window samples at locations $S1(x1, y1)$, $S2(x2, y2)$ and $S3(x3, y3)$, then to compute the coordinates of the sub-interval boundaries from the midpoint of the interval s1s2 to the midpoint of the interval s2s3 (in the x dimension), start by calculating the average velocity in each sample interval, and then the average acceleration between intervals. In the following equations, n represents the chosen number of sub-intervals.

$$\overline{V_{S1S2}} = \frac{x2 - x1}{n} \quad (EQ. 1)$$

$$\overline{V_{S1S2}} = \frac{x3 - x2}{n} \quad (EQ. 2)$$

$$\overline{A} = \frac{\overline{V_{S3S2}} - \overline{V_{S2S1}}}{n} \quad (EQ. 3)$$

Then computing the coordinates of the sub-interval boundaries in the interval between the sample midpoints by observing that, in the x dimension:

$$x = x + \int_{t0}^{t} (v0 + \overline{A}t)\Delta t \quad (EQ. 4)$$

$$x = x0 + v0(t - t0) + \tfrac{1}{2}\overline{A}(t^2 - t0^2) \quad (EQ. 5)$$

where t is a variable in time that increments by one for each sub-interval. Analogous computations are made in the y dimension to provide the coordinates for the boundaries of the velocity smoothed sub-intervals. An application of "paint spray" is made at the boundary of each sub-interval, with flow reduced in proportion to the number of mini-samples as mentioned above. In addition, pressure smoothing is preferably employed in a manner similar to velocity smoothing to account for changes in the pressure signal which controls the "paint flow".

As stated above, randomness must also be introduced into the airbrush modeling routine in order to provide a simulation of the appearance of "texture" of a real airbrush. The improved airbrush modeling routine incorporates a noise distribution onto the contribution profile of the brush. A brush profile without noise is created by computing a normalized brush profile based on a Gaussian distribution of the form:

$$\text{brushcontribution} = e^{\frac{-x^2}{2\sigma^2}} \quad (EQ. 6)$$

where x equals the magnitude of the distance from the center of the brush. The brush profile is normalized by setting the contribution of the pixel at the center of the brush to be the maximum permitted contribution, and $\sigma$, the standard deviation, is set to the brush width divided by six so that the contribution trails off almost to zero for pixels at the edges of the brush. Thus, the brush profile will more closely approximate the operation of a conventional mechanical airbrush in which a greater amount of paint is applied at the center of a paint spot formed by the brush and a lesser amount of paint is applied at the edges of the paint spot.

In principle, it would be desirable to add some random noise into the brush mask at each application at a sub-interval boundary. In practice, however, the generation of this random noise would be prohibitively expensive in computing overhead during a real time operation. A compromise approach is employed in the improved airbrush modeling routine in which a series of k brush masks are precomputed and stored in a look-up table with each brush mask having an unrelated random noise pattern added. Thus, each brush mask in the series represents the original noiseless brush profile modified by the random noise pattern. During operation, the improved airbrush modeling routine rotates through the series of k brush masks for each application at the boundary of a sub-interval. The value of k must be sufficiently large so that no discernible pattern appears in the enhanced image. Experimentation has shown that a value of eight for k is sufficient for this purpose, although other values may of course be employed.

The random noise that is added into the brush profile is constrained to fall within a tolerance band around the nominal value of each pixel in the profile. Preferably, the size of the band may be specified as a percent of the nominal value. The larger the band, the greater the amount of texturing that will be introduced. Experimentation has shown that a band of +/−30% yields pleasing visual results.

The following pseudo-code outlines the steps employed by the improved airbrush modeling routine to create an airbrush mask given an event supplied by the windowing system software:

---

Compute average acceleration in X and Y dimensions based on EQ. 3;
Precompute the acceleration term in EQ. 5 for all applicable values of t;
  For each line in the brush;
    For each sub interval;
      Determine the brush contribution of this
        brush pixel in the appropriate brush in a
        series of brushes that incorporate random
        noise, using a look-up operation in a pre-
        computed table of all possible
        contributions;
      Determine the coordinates of the boundary of
        this sub-interval relative to the image
        view coordinate system using EQ. 5;
      Determine the address of the boundary in the
        buffer of cumulative mask results to date,
        using a look-up process to avoid
        multiplication;
      Compute clipped cumulative brushing;
      Update the cumulative mask result;
      Apply the image processing operation at this
        pixel;
    end;
  end;
end.

---

The pseudo-code preferably utilizes look-up table operations in the nested loop to avoid operations. It will be understood that the improved airbrush modeling routine may also be implemented using other program structures other than the particular pseudo-code provided above.

As was previously stated, it is also desirable that the electronically modeled air brush also mimic the function as well as result of a conventional mechanical airbrush. Prior systems, such as the KODAK PREMIER system described above, did not continue the flow of "paint" when the stylus was held in a stationary position, as it was assumed that the operator did not wish to continue the airbrushing operation unless movement was detected. In practice, however, it has been found to be desirable to continue the application of "paint", i.e., image enhancement operation, to more closely approximate the operation of a conventional mechanical airbrush. In reality, the airbrush modelling routine has not actual analogue to the buildup of liquid paint to which will actually flow across the work surface. Instead, a maximum application of the selected image enhancement operation will be reached within the area of the brush mask. For example, if the selected image enhancement operation is the addition of red color, the area defined within the brush mask will simply reach the maximum red value if the stylus is not moved. The addition of red color, however, will not spill over or bloom into areas outside the mask.

It will be understood that the invention has been described with reference to particular preferred embodiments thereof. Modification and variations, however, may be made within the scope of the appended claims. For example, although the preferred embodiment incorporated both the creation of sub-intervals with velocity smoothing and the introduction of randomness into the brush mask, each of these features may be independently employed.

What is claimed is:

1. A method for providing an airbrush modeling function in a color image reproduction apparatus, said method comprising the steps of:
generating a plurality of events with a windowing system program which are indicative of the path of a pointer device and define a plurality of sample intervals;
computing the coordinates of a predetermined number of sub-interval boundaries between the sample intervals with a processing unit;
generating a plurality of brush masks each of which incorporates a random noise pattern; and
applying a selected image enhancement operation to each of said sub-intervals utilizing one of the plurality of brush masks;
wherein the step of computing the coordinates of the sub-interval boundaries includes the steps of calculating the average velocity of each sample interval and determining the average acceleration between sample intervals based on a predetermined number of sub-intervals.

2. A method of providing an airbrush modeling function in a color image reproduction apparatus as claimed in claim 1, wherein each of the brush masks includes a different and distinct random noise pattern.

3. A method of providing an airbrush modeling function in a color image reproduction apparatus as claimed in claim 1, wherein the image enhancement operation applied to adjacent sub-intervals utilizes different brush masks.

4. A method of providing an airbrush modeling function in a color image reproduction apparatus as claimed in claim 1, wherein the brush masks are precomputed based on a normalized brush profile and are stored in a look-up table located in the processing unit.

5. A color image reproduction apparatus including an airbrush modeling routine comprising:
means for generating a plurality of events with a windowing system program which are indicative of the path of a pointer device and define a plurality of sample intervals;

processing means for computing the coordinates of a predetermined number of sub-interval boundaries between the sample intervals;

means for generating a plurality of brush masks each of which incorporates a random noise pattern; and means for applying a selected image enhancement operation to each of said sub-intervals utilizing one of the plurality of brush masks;

wherein the processing means computes the coordinates of the sub-interval boundaries by calculating the average velocity of each sample interval and determining the average acceleration between sample intervals based on a predetermined number of sub-intervals.

6. A color image reproduction apparatus as claimed in claim 5, wherein each of the brush masks includes a different and distinct random noise pattern.

7. A color image reproduction apparatus as claimed in claim 5, wherein the brush masks are precomputed based on a normalized brush profile and are stored in a look-up table located in the processing means.

8. A method of providing an airbrush modeling function in a color image reproduction apparatus, said method comprising the steps of:

generating a plurality of events with a windowing system program which are indicative of the path of a pointer device and define a plurality of sample intervals; and computing the coordinates of a predetermined number of sub-interval boundaries between the sample intervals with a processing unit by calculating the average velocity of each sample interval and determining the average acceleration between sample intervals based on a predetermined number of sub-intervals.

* * * * *